A. C. LINDGREN.
TWO WAY PLOW.
APPLICATION FILED NOV. 4, 1909.

999,323.

Patented Aug. 1, 1911.
4 SHEETS—SHEET 1.

A. C. LINDGREN.
TWO WAY PLOW.
APPLICATION FILED NOV. 4, 1909.

999,323.

Patented Aug. 1, 1911.
4 SHEETS—SHEET 3.

Witnesses:
Frances Ober
William C. Law

Inventor
A. C. Lindgren
By his Attorney
P. T. Dodge

A. C. LINDGREN.
TWO WAY PLOW.
APPLICATION FILED NOV. 4, 1909.
999,323.
Patented Aug. 1, 1911.
4 SHEETS—SHEET 4.
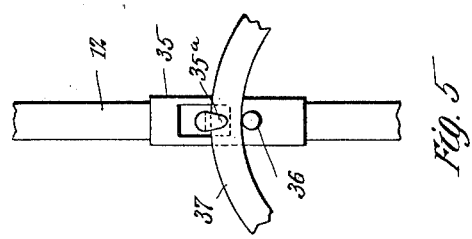
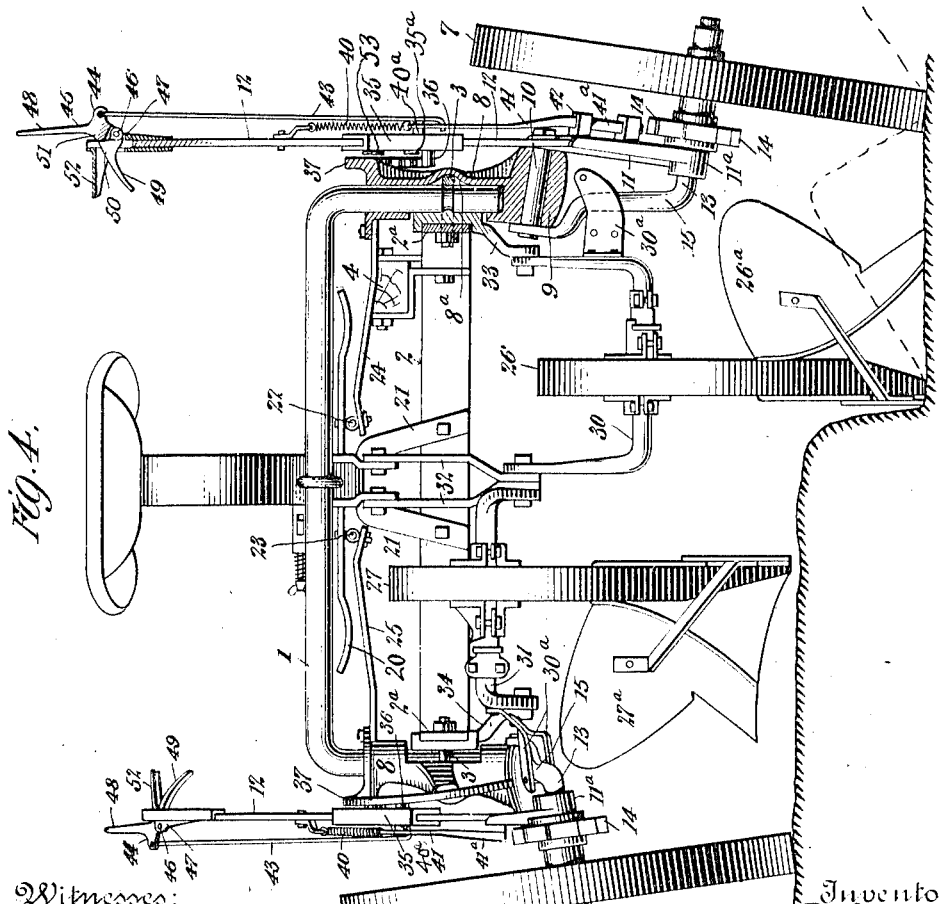

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

TWO-WAY PLOW.

999,323.         Specification of Letters Patent.         Patented Aug. 1, 1911.

Application filed November 4, 1909. Serial No. 526,263.

*To all whom it may concern:*

Be it known that I, ALEXUS C. LINDGREN, of Moline, county of Rock Island, and State of Illinois, have invented a new and useful Improvement in Two-Way Plows, of which the following is a specification.

This invention relates to wheel plows of the type in which a wheeled frame is provided with two plows pointing in the same direction but facing right and left, so that by the alternate use of the two plows, with the machine travelng respectively in opposite directions, all the furrows will be thrown or turned in the same direction. In other words, when one plow is in action, with the machine traveling in one direction, the furrows will be turned in the same direction as those turned by the other plow, with the machine traveling in the opposite direction. By this means, the machine by being turned at the end of each furrow toward the land, will plow the entire field with the furrows in one direction, thus leaving it level and free from dead furrows or ridges.

My invention consists of various improvements in machines of this type, directed more particularly to the means for mounting and raising and lowering the plow beams; to the means for maintaining the machine truly in the line of draft, so that the furrows will be straight and uniform; to the means for guiding the machine; and to various other features designed to render the mechanism simple in its construction and adjustments, and effective in operation.

Figure 1:
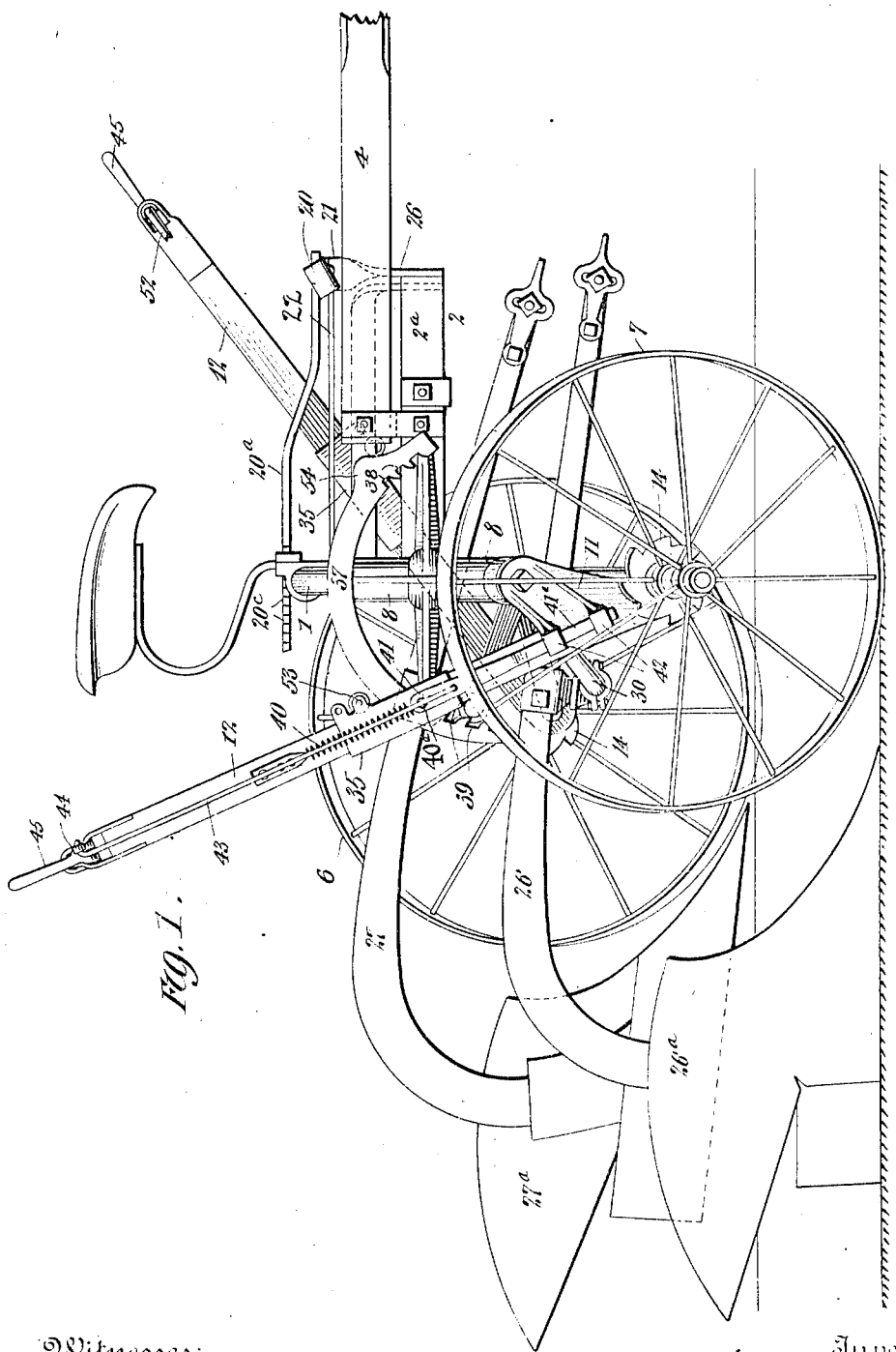
Figure 2:
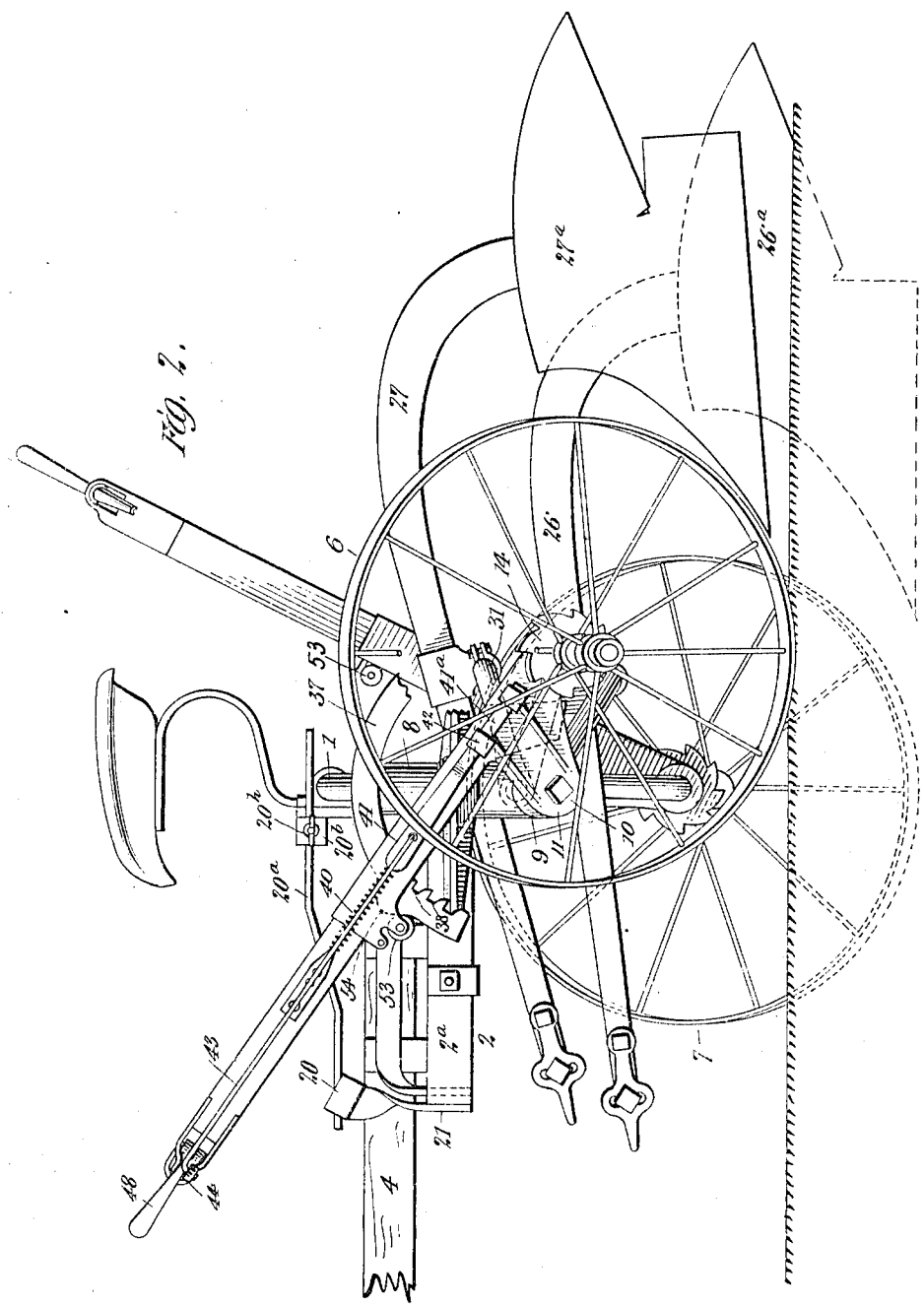
Figure 3:
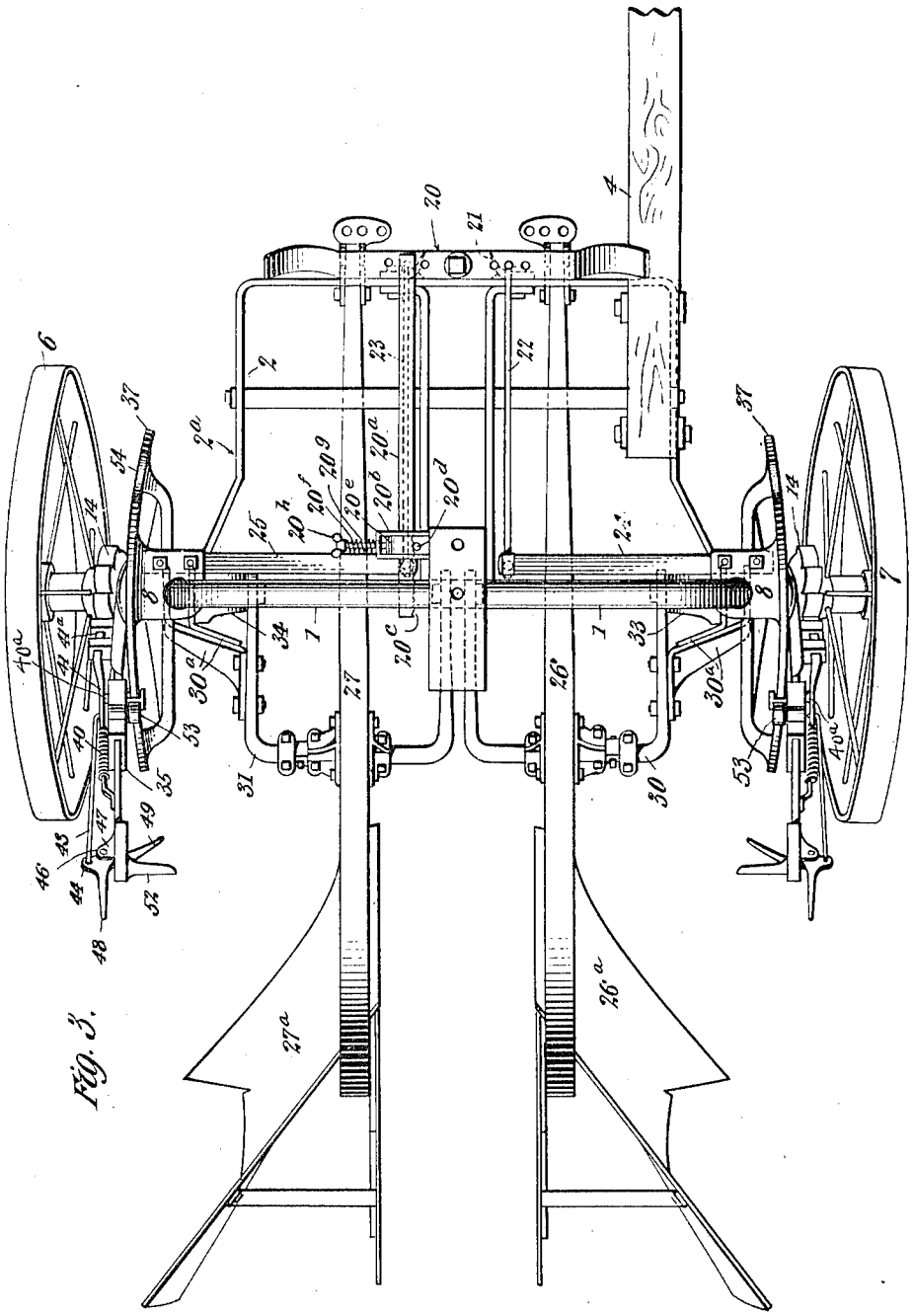

In the accompanying drawings:—Figure 1 is a side elevation of my improved machine, showing the near plow lowered to throw the furrows to the right, and the other plow raised out of action. Fig. 2 is a similar view from the opposite side of the machine. Fig. is a top plan view of the machine. Fig. 4 is a rear elevation of the machine with the parts in the position of Fig. 1, certain portions being in section and broken away. Fig. 5 is an elevation of a portion of one of the adjusting levers, showing how the sliding block carried thereby is held in engagement with the segmental frame, certain parts being omitted.

Referring to the drawings:—The frame of the machine consists of the arched member 1 and the horizontal forwardly extending U-shaped frame member 2, the sides 2ª of which are firmly fixed at their rear ends to the vertical limbs of the arched member by means of clip-bolts 3, extending through the frame and embracing the member limbs. At its forward end, and to one side, the frame has fixed to it a tongue 4, while at the rear, and supported over the arched member, is a driver's seat sustained by a seat spring or bracket fixed at its lower end to the member. The frame is supported on opposite sides by wheels 6 and 7, which are so mounted that they may be swiveled or turned around a vertical axis to guide the machine, and may also be shifted to and fro to raise and lower the plow beams; and as the means for mounting the two wheels are the same on both sides of the machine, a description of those on one side will suffice.

Each limb of the arched member is loosely encircled by a vertical collar 8 formed with a peripheral swell having an internal groove 8ª embracing the clip-bolt 3, whereby the collar is confined in a vertical direction on the member limb but is permitted to rock horizontally thereon around a vertical axis. Fixed to the lower end of the collar is a downwardly and outwardly inclined bearing sleeve 9, in which is mounted a short rock-shaft 10, projecting at its inner end a short distance beyond the end of the sleeve and having fixed to its outer end a downwardly extending brackt plate 11, from the upper end of which extends a vertical hand lever 12, fixedly connected with the bracket plate, this hand lever being for the purpose, as will be presently described, of controlling the adjustments of the plow beams. At its lower end, the bracket plate is formed with a sleeve 11ª encircling and fixed to a horizontal downwardly inclined stub axle 13, on which is loosely mounted, at the outer side of the sleeve, the furrow wheel 7, having fixed to it adjacent to the sleeve 11ª, a ratchet wheel 14, the purpose of which will presently appear. The stub axle 13 is provided at its enner end with an upwardly extending arm or stem 15, which extends vertically in line with the vertical axis on which the collar 8 turns, the upper extremity of said arm being offset and mounted on the inner projecting end of the rock shaft 10, before alluded to. From this construction, it will be seen that the wheels 6 and 7 are carried by supports which are movable around a vertical axis passing centrally through the vertical limbs of the arched member. It will further be seen that the wheels are staggered or inclined inwardly to adapt them to travel in the corner of the furrow and act as furrow wheels to maintain a uniform cut, one of the wheels, as will be presently described, acting as a land wheel, while the other is traveling in the furrow, and vice versa, according to the direction in which the machine may be traveling. It will further be seen that the stub axles on which the wheels are mounted, are pivotally connected at a point above the wheel axis, so that the wheels may be swung bodily back and forth in relation to the frame on a downwardly inclined axis coincident with the rock shafts 10, the purpose of this swinging motion being, as will be presently described, to effect the raising and lowering of the plow beams. It will further be seen that the wheels may be turned or swiveled around a vertical axis, the purpose of this being to guide the frame without the necessity of swinging the tongue to effect this object. The swiveling motion of the wheels to thus guide the machine is concontrolled and effected by a transversely arranged horizontal foot lever 20, pivoted between its ends on a bracket 21, fixed to the front end of the frame member. To the ends of this lever are jointed the forward ends of two bars 22 and 23, extending rearwardly side by side with their rear ends jointed to the inner ends respectively of two horizontal transverse arms 24 and 25, which arms have their outer ends fixed respectively to the upper ends of the two collars 8 of the wheel supports at points forward of the vertical axis on which the collars turn. The driver by rocking the lever 20 on its central axis, may, by the connections described, turn or swivel the wheels to the right or left, and in this manner cause the machine to track in the direction in which the wheels are turned.

In order that when the plow is in operation, the wheels may be held, as far as any swiveling action is concerned, in the position they may have been adjusted by the foot lever 20, I provide a locking device adapted to hold the wheels, and of such construction that it may be readily released by the foot lever. This device consists of a fore and aft rod 20ª, pivoted at its forward end to the foot lever, to one side of its axis, and extending rearwardly with its rear end extending loosely through slots in a U-shaped frame 20ᵇ, fixed to the frame of the machine. In one edge, the rod 20ª is provided with a series of notches 20ᶜ, engaged by a roller 20ᵈ, mounted between the ends of a second U-shaped frame 20ᵉ, which embraces the rod and has connected with its end, a stem 20ᶠ, extending loosely through the end of the frame 20ᵇ, a spring 20ᵍ encircling the stem and bearing between the end of the frame 20ᵇ and a tension nut 20ʰ on the end of the stem. As a result of this construction, the spring acts to engage the roller with yielding pressure in one of the notches in the rod, and in this manner locks the parts frictionally and yieldingly so as to hold the wheels in the position set by the foot lever. In operation, the locking device described, while maintaining the wheels in the position set, yet at the same time may be readily actuated by the driver to release them when the direction is to be changed. By reason of the comparatively great leverage on the swiveling wheels, due to the form of the connection between them and the foot lever such connection embodying the short leverage between the axis of the lever 20 and the connection therewith of the bars 22 and 23, and the comparatively long leverage between the inner ends of the arms 24 and 25 and their outer ends where they are connected with the collars 8, the driver may readily release the locking device when the wheels are to be turned, and as the leverage of the wheels on the foot lever is correspondingly decreased, the locking device will not be released by the action of the wheels, so that the latter will be maintained in the position set.

Two plow beams 26 and 27 are equipped with moldboard plows 26ª and 27ª, which point in the same direction in the line of travel, but which are arranged with their moldboards right and left or facing in opposite directions. One of the plows is raised out of action when the other is lowered into action with the machine traveling in one direction, and when the machine is reversed at the end of the furrow and travels in the opposite direction, the plow which had before been in action is raised out of action and the other lowered, with the result that all of the furrows will be thrown in the same direction, notwithstanding the successive reversals of the direction of travel of the machine.

The beams are pivoted between their ends respectively to two bails 30 and 31, jointed at their adjacent ends to a hanger 32, depending from the arched member, and jointed at their outer ends respectively to arms 33 and 34, fixed to the side bars of the frame member and at its rear, the construction being such that the bails may be swung independently of each other and relatively to the frame. The outer limbs of the bails are operatively connected with the swinging stub axles in such manner that when these axles are shifted forwardly and backwardly with reference to the frame, the bails will be swung with them, and in this way will raise and lower the plow beams, as the case may be. In order that this action may take place and not interfere with the swiveling motion of the wheels, the vertical portions of the stub axles are each loosely embraced between two plates 30ª, fixed to and extending laterally from the outer limbs of the two bails respectively, the result being that when the wheels are moved forward or backward, the stems of the stub axles engaging between the plates will move the bails correspondingly. When the plow beams are in lowered position and the wheels are swiveled or turned to guide the machine, the vertical portions of the stub axles will turn in the plates around a vertical axis coincident with that of the collars 8, 8, but when the plows are elevated and the wheels are swiveled, the stub axles will shift laterally between the plates. It is seen, therefore, that while the bails will be swung simultaneously with the forward and backward motion of the wheels, the latter may at the same time be swiveled or turned without regard to the position which the bails may be as regards their fore and aft adjustments.

The vertical adjustments of the plow beams and the raising and lowering of the same are controlled by the hand levers 12, 12, before alluded to, through the medium of the mechanism now to be described; and as this mechanism is the same on both sides of the machine, a description of that on one side will suffice.

On reference to Figs. 1 and 4, it will be seen that each hand lever 12 has mounted on it a sliding block 35, provided on its lower end with an inwardly extending lug 36 adapted to coöperate with the underside of a segmental frame 37, extending fore and aft and fixed to the collar 8, the block being held to the frame by means of an overhanging nose 35ª carried by the block, and the said frame being provided at its front and rear with two sets of notches 38 and 39, in which the lug 36 is adapted to enter. The block 35 is acted on by a spring 40 connected to it through the medium of a plate 41 which is connected to the block as hereinafter described and to the lever, and tending to draw the block upwardly and maintain connection of the lug with the segmental frame. On its opposite side, the block has connected with it by a pin 40ª the upper end of the plate 41 above referred to, whose lower end is in the form of a plunger 41ª, mounted in guides 42 on the bracket 11 and in position to be engaged between the teeth of the ratchet wheel 14, before alluded to. Connected with this plate is the lower end of a rod 43, which extends upwardly alongside the lever 12 and has its upper end jointed to one arm 44 of an elbow lever 45, mounted to rock on a pivot pin 46, extending between ears 47 on the upper end of the lever 12. The other arm 48 of the elbow lever extends upwardly and serves as a handle for rocking the elbow lever to actuate the parts connected therewith. The elbow lever, where it encircles the pivot-pin, is slotted, and in this slot and on the pin 46, is mounted the inner end of an arm 49, provided with a lug 50, engaging a lug 51 on the elbow lever. From this construction, it will be seen that the spring 40 pulling up on the sliding block will act, through the connection of said block with the rod, to hold the elbow lever with its arm 48 in an upright position, and by the engagement of the lugs 50 and 51 with each other, will hold the pivoted arm 49 at a downward inclination. When the pivoted arm is swung upwardly, it will, by the engagement of the lugs 50 and 51 with each other, rock the elbow lever 45 downwardly, which action will in turn lower the block 35 and disengage the lug thereon from the notches in the segment frame. At the same time, the plunger 41ª will be projected downwardly but not sufficiently far to extend in the path of the teeth of the ratchet wheel 14, the motion of the plunger being limited by the pivoted arm 49 contacting with a fixed lateral handle 52 on the upper end of the lever 12. When, however, the arm 48 is swung downwardly, it will move independently of the pivoted arm 49, and the plunger will be projected to its full extent and into engagement with the teeth of the ratchet wheel, thereby locking the furrow wheel against rotary motion. It is seen, therefore, that by the action of the pivoted arm 49, the lever will be released from the segment frame, and by swinging the lever back and forth when thus released, the ground wheels may be swung back and forth and the depth of the plow in the ground controlled by the engagement of the lug in one of the rear notches in the segment frame. If, however, the plow is to be raised out of action, as at the end of the furrow for turning the machine, the arm 48 of elbow lever 45 is depressed, which will first disengage the lug 36 from the segment frame, and will then project the plunger 41ª downwardly between the teeth of the ratchet wheel 14, thereby locking the furrow wheel against movement, the result being that the forward motion of the plow by the draft animals, with the furrow wheel in contact with the ground, will draw the frame of the plow, including the arched member, forward relatively to the wheel, and the parts locked thereto, this relative motion being about the shaft 10 as an axis and resulting in the upward swing of the bail and the elevation of the beam and the forward motion of the hand lever alongside of and with reference to the segment frame. This motion of the lever will continue until a roller 53 on the sliding block rides up a stop 54, projecting upwardly from the segment frame near its forward end, whereupon the slide carrying the roller will be moved upwardly with reference to the lever, thereby withdrawing the plunger from engagement with the ratchet wheel and releasing the latter, and at the same time engaging the lug 36 on the slide with one of the notches in the underside of the segment frame at the front, with the result that the lever will be held with the plow beam locked in elevated position. It is seen, therefore, that the elevation of the beams is effected entirely by the draft of the animals, the projection of the plungers between the teeth of the ratchets, acting merely to initiate the raising action.

In lowering the plow into action, the pivoted arm 49 is swung upwardly by the hand, thereby disengaging the lug 36 from the notch in the segment frame, and the beam by its own weight will swing the bail down and restore the parts to their former lowered position, the plow being locked to its proper depth in the ground by the engagement of the lug in one or the other of the notches at the rear end of the segment frame.

It will be observed that while the axles of the furrow wheels are downwardly inclined to stagger the wheels, and while the axis of the shafts 10 on which the wheels swing is similarly inclined, so that the wheels will maintain their staggered positions when raised or lowered, the levers 12 extend in a truly vertical position from the bracket plates. As a result, when the levers are shifted back and forth, they will move in outwardly curved paths and in close contact with the segment frames, which are correspondingly curved to enable the lever to cooperate therewith. This action causes the levers, when at their front or rear positions, to approach and be within reach of the driver.

In the operation of the machine, when it is drawn over the field in one direction, one of the plows, preferably that on the right, is lowered into action, and the other is raised out of action, the result being that the furrows will be turned to the right, the furrow wheel on the right traveling in the furrow previously made, and the wheel on the other side of the machine, which is swung to the rear and consequently somewhat elevated, traveling on the unplowed ground. As the end of the furrow is reached, the hand lever 12 of the active plow is locked to its furrow wheel by the operation of the elbow lever 45, and the draft of the animals will elevate the active plow out of action. The driver then by the foot lever 20 turns the wheels to the left for the next furrow, and as the machine straightens out for the return, the driver releases the lever 12 on the left by drawing its pivoted arm 49 upwardly. The plow on the left is then lowered by its weight, and its hand lever swings to the rear, where it is locked to the segment to hold the plow down to the proper depth. As the machine starts on the return furrow, the wheel on the left travels in the furrow previously made, and the wheel on the right travels on the land, and the furrow is thrown toward and in the same direction as the previous furrows. At the end of this furrow, the active plow is raised, as before, and the other lowered, and so on, the machine turning toward the land at the end of each furrow, and the two plows acting alternately and throwing all the furrows in the same direction away from the land.

It will be observed that the two wheels, constituting the sole support of the machine, act alternately as land and furrow wheels, as the direction of the machine is alternately reversed, and as the wheels are staggered, they, by traveling in the corners of the furrows, cause the successive furrows to be cut straight and uniform.

In the operation of the machine, the draft animals will sometimes walk a little to one side and in this manner affect the width of cut. If the guide of the machine, under these conditions, is accomplished by swinging the tongue, the angle of the plows with respect to the line of the furrow must be corrected or resisted from the forward end of the tongue. This action causes drag on and discomfort to the draft animals. By means of my improved guiding device, the plow, frame and tongue all travel parallel with the furrow, and the operation of the guiding device to effect a change in the width of the cut does not throw either plow, frame or tongue out of a straight line with the furrow, the inclined furrow wheels tending to draw the whole plow bodily to the side desired. The machine being guided independently of the tongue, that is, by the swiveling of the wheels, enables the turns to be made uniformly, positively and promptly, and without drag on or discomfort to the draft animals, as usually occurs when the machine is turned by the swinging of the tongue.
In the foregoing description, and in the accompanying drawings, I have described and illustrated my invention in the form in which I prefer to adopt it, but it will be understood that the invention is not limited to any particular details, except in so far as such details are specified in the claims.

Having thus described my invention, what I claim is:—

1. In combination with a frame, two plows pointing in the same direction but facing in opposite directions and movable up and down for alternate action, and two supporting wheels, one on each side of the frame, said wheels being each movable back and forth with reference to the frame on a downwardly inclined axis to raise and lower the plows, and said wheels inclined inwardly or staggered to act as furrow wheels.

2. In combination with a frame, ground wheel supports movable back and forth relatively to each other and to the frame and movable also around a vertical axis, ground wheels carried by said supports, plow beams carried by the frame and movable up and down in relation thereto, connections between the plow beams and wheel supports, whereby the back and forth movement of said supports will raise and lower the beams relatively to the frame while allowing the wheel supports to swivel independently of their connections with the beams, and means for controlling the swiveling motion of the wheel supports.

3. In combination with a frame, wheel supports movable about vertical axes and also back and forth relatively to each other and also laterally relatively to the frame, plow beams, supporting bails carrying the beams and mounted on the frame on horizontal axes, and connections between the bails and wheel supports formed to cause the bails to be swung on their axes when the wheel supports are moved back and forth and permitting of a relative movement of the wheel supports both laterally and around their vertical axes.

4. In combination with a frame, a wheel support movable about a vertical axis and also forwardly and backwardly, a ground wheel mounted on said support, said wheel support being formed with a portion extending, when the support is in one position, vertically in line with the vertical axis on which the support is movable, a bail mounted on the frame, a plow beam carried by the bail, and plates carried by the bail and loosely embracing the vertical portion of the wheel support.

5. In combination with a frame, plow beams, members carrying the plow beams and mounted on the frame to swing back and forth relatively thereto and thereby raise and lower the beams relatively to the frame, wheel supports movable forwardly and backwardly relatively to each other, and connections between the said beam-carrying members and wheel supports adapted to cause the members to move with the supports and in relation to which connections said wheel supports are movable.

6. In combination with a frame, plow beams mounted thereon and movable vertically in relation thereto, wheel supports movable relatively to each other and longitudinally of the frame and also movable around vertical axes in relation thereto, wheels mounted on said supports, and connections between the wheel supports and the plow beams adapted to cause the elevation of the beams as the supports are moved longitudinally, said connections formed to permit the wheel supports to turn on their vertical axes relatively thereto.

7. In combination with a frame, a wheel support mounted on a downwardly inclined axis, a wheel mounted on said support on a downwardly inclined axle, a segment frame connected to the wheel support and curved outwardly between its ends, and a hand lever connected with the wheel support and extending vertically alongside the segment frame and coöperating therewith, a plow beam, and connections between the plow beam and wheel support.

8. In combination with a frame, a member mounted thereon to turn on a vertical axis, a segment frame connected with said member, a wheel support pivoted to said member on a transverse downwardly inclined axis, a downwardly inclined axle on said wheel support, a wheel mounted on the axle, a lever connected rigidly with the wheel support and extending vertically alongside the segment frame, a latch carried by the lever and coöperating with the segment frame, a plow beam, movable up and down relatively to the frame and a connection between the plow beam and wheel support in relation to which the wheel support may turn on its vertical axis.

9. In combination with a frame, two plows pointing in the same direction but facing in opposite directions and movable up and down to act alternately, two wheels, one on each side of the frame, supports for said wheels movable up and down relatively to each other at their wheel supporting ends and relatively to the frame on a substantially horizontal axis and also movable around a vertical axis, whereby the raised wheel will act as a land wheel and the lowered wheel as a furrow wheel, and whereby the support for the raised wheel will shift laterally when said support is turned on its vertical axis, and connections between the plows and said wheel supports, said connections being formed to raise and lower the plows as the wheel supports are moved on their substantially horizontal axes, and said wheel supports being movable relatively to said connections.

10. In combination with a frame, two plows pointing in the same direction but facing in opposite directions and movable up and down to act alternately, two wheels, one on each side of the frame, wheel supports for said wheels movable relatively to the frame around vertical axes and movable also back and forth relatively to each other and to the frame, connections between the wheel supports and plows, whereby the back and forth movement of the wheel supports will raise and lower the plows, said connections permitting the wheel supports to be moved relatively to the same around their vertical axes; a draft device connected with the frame, and means independent of the draft device for turning the wheel supports on their vertical axes.

11. In combination with a frame, ground wheel supports movable relatively thereto around a vertical axis and also back and forth relatively to each other, plows sustained by the frame and movable relatively thereto up and down, connections between the ground wheel supports and plows formed to cause the plows to be raised and lowered when the ground wheel supports are moved back and forth, a horizontal transverse foot lever mounted on the frame, inwardly extending arms connected with the wheel supports, and connections between the foot levers and the arms.

In testimony whereof I hereunto set my hand this 28th day of October, 1909, in the presence of two attesting witnesses.

ALEXUS C. LINDGREN.

Witnesses:
T. C. BLANDING,
W. V. RICHARDS.

Copies of this patent may be obtained for five cents each, by addressing the "Commissioner of Patents, Washington, D. C."